United States Patent
Xia et al.

(10) Patent No.: US 11,859,998 B2
(45) Date of Patent: Jan. 2, 2024

(54) MAP DATA UPDATING METHOD, APPARATUS, DEVICE, AND READABLE STORAGE MEDIUM

(71) Applicant: BEIJING BAIDU NETCOM SCIENCE TECHNOLOGY CO., LTD., Beijing (CN)

(72) Inventors: Deguo Xia, Beijing (CN); Liuhui Zhang, Beijing (CN); Jizhou Huang, Beijing (CN); Hui Zhao, Beijing (CN); Zhen Lu, Beijing (CN); Hongxia Bai, Beijing (CN); Yuting Liu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 460 days.

(21) Appl. No.: 17/207,542

(22) Filed: Mar. 19, 2021

(65) Prior Publication Data

US 2021/0207976 A1 Jul. 8, 2021

(30) Foreign Application Priority Data

Sep. 4, 2020 (CN) .......................... 202010922958.1

(51) Int. Cl.
*G01C 21/00* (2006.01)
*G06F 16/23* (2019.01)
(Continued)

(52) U.S. Cl.
CPC ..... *G01C 21/3893* (2020.08); *G01C 21/3815* (2020.08); *G01C 21/3837* (2020.08);
(Continued)

(58) Field of Classification Search
CPC ............ G01C 21/3893; G01C 21/3815; G01C 21/3837; G06F 16/2379; G06F 16/29;
(Continued)

(56) References Cited

U.S. PATENT DOCUMENTS

2009/0192706 A1* 7/2009 Nomura ............. G01C 21/3859
701/533
2012/0065811 A1* 3/2012 Nakamura ......... G01C 21/3815
701/1
(Continued)

FOREIGN PATENT DOCUMENTS

CN 110146097 A 8/2019
CN 110751261 A 2/2020
(Continued)

OTHER PUBLICATIONS

Joshua S. Greenfield "Matching GPS Observations to Locations on a Digital Map" (Jan. 2002 ), New Jersey Institute of Technology pp. 1-13.*

(Continued)

*Primary Examiner* — Gertrude Arthur Jeanglaude
(74) *Attorney, Agent, or Firm* — J.C. PATENTS

(57) ABSTRACT

The present application discloses a map data updating method, an apparatus, a device and a readable storage medium. The specific implementation solution is: after receiving road information reported by an electronic device, a server obtains multiple sequences according to the road information, and each road information belonging to the same sequence has the same type and location. After that, the server inputs each road information contained in the sequences to a pre-trained neural network model, so that the neural network model outputs a recognition result according to the sequences. The server updates map data according to the recognition result. With such solution, valid road information is recognized by combining context of each road information in the sequences and the neural network technology, and the map data is updated, which achieves the purpose of accurately updating the map data.

20 Claims, 6 Drawing Sheets

(51) Int. Cl.
| | |
|---|---|
| *G06F 16/29* | (2019.01) |
| *G06N 3/04* | (2023.01) |
| *G06N 3/08* | (2023.01) |
| *G08G 1/09* | (2006.01) |
| *G06V 20/54* | (2022.01) |
| *G06F 18/214* | (2023.01) |
| *G06F 18/21* | (2023.01) |

(52) U.S. Cl.
CPC .......... *G06F 16/2379* (2019.01); *G06F 16/29* (2019.01); *G06N 3/04* (2013.01); *G06N 3/08* (2013.01); *G08G 1/093* (2013.01); *G06F 18/214* (2023.01); *G06F 18/217* (2023.01); *G06V 20/54* (2022.01)

(58) Field of Classification Search
CPC ....... G06F 18/217; G06F 18/214; G06N 3/04; G06N 3/08; G08G 1/093; G06V 20/54
See application file for complete search history.

(56) References Cited

U.S. PATENT DOCUMENTS

| | | | | |
|---|---|---|---|---|
| 2013/0238648 | A1* | 9/2013 | Fujiwara | G06F 16/29 707/758 |
| 2017/0059353 | A1* | 3/2017 | Madine | G06F 16/29 |
| 2019/0043486 | A1 | 2/2019 | Salloum | |

FOREIGN PATENT DOCUMENTS

| | | |
|---|---|---|
| CN | 111160484 A | 5/2020 |
| JP | 2004077335 A | 3/2004 |
| JP | 2004205344 A | 7/2004 |
| JP | 2016161456 A | 9/2016 |
| JP | 2019040175 A | 3/2019 |
| JP | 2019212186 A | 12/2019 |
| KR | 20150052272 A | 5/2015 |
| KR | 20180102221 A | 9/2018 |
| KR | 20200015508 A | 2/2020 |

OTHER PUBLICATIONS

First Office Action of the parallel application JP2021-026517.
First Office Action of the priority application CN202010922958.1.
Notice of Allowance of the parallel application KR10-2021-0013958.
First Office Action of the parallel application KR10-2021-0013958.
The extended European search report of EP211651211.
NPL1: "A survey of attacks and detection mechanisms on intelligent transportation systems: VANETs and IoV", AD HOC Networks, vol. 61, Mar. 18, 2017, pp. 33-50.
NPL2: "An Effective Misbehavior Detection Model using Artificial Neural Network for Vehicular Ad hoc Network Applications", 2017 IEEE Conference on Application, Information and Network Security (AIMS), Nov. 13, 2017 (Nov. 13, 2017), pp. 13-18.

* cited by examiner

My data updating method, an apparatus, a device, and a readable storage medium.

MAP DATA UPDATING METHOD, APPARATUS, DEVICE, AND READABLE STORAGE MEDIUM

CROSS-REFERENCE TO RELATED APPLICATION

This application claims priority to Chinese Patent Application No. 202010922958.1, filed on Sep. 4, 2020, the disclosure of which is hereby incorporated by reference in its entirety.

TECHNICAL FIELD

The present application relates to the technical field of smart cities, in particular to the technical field of deep learning in electronic maps, intelligent transportation, automatic driving, and artificial intelligence technologies, and in particular to a map data updating method, an apparatus, a device and a readable storage medium.

BACKGROUND

With the rapid development of cities and the increase in road complexity, users' requirements for electronic maps are becoming stronger and stronger. Map data is the basis of the electronic maps, mainly including road information, etc. The road information includes, for example, road construction, road closures, and occurrence of traffic accidents.

Under normal circumstances, the road information is not static. Therefore, it is necessary to update the map data to prevent a user from using an electronic map corresponding to a wrong map data to navigate, which increases the travel cost of the user. In a common map data updating process, multiple Roadside Units (RSU) recognize road information and broadcast it to an On board device. After receiving the road information, the On board device uploads the road information to a server. The server utilizes these road information to update the map data.

In the above-mentioned map data updating, a situation of malicious destruction of the On board device is not considered. However, the On board device that is maliciously destructed is likely to report invalid road information through means such as blocking, forgery, tampering, which results in errors in the map data updating.

SUMMARY

The present application provides a map data updating method, an apparatus, a device, and a readable storage medium, which, by recognizing valid road information, and updating map data utilizing the valid road information, achieves the purpose of accurately updating the map data.

In a first aspect, an embodiment of the present application provides a map data updating method, including:

receiving road information reported by an electronic device, where the road information is road information broadcast to the electronic device by a roadside unit;

determining at least one sequence according to the road information, where road information belonging to the same sequence in the at least one sequence has the same type and occurrence location;

inputting road information contained in each sequence in the at least one sequence into a pre-trained neural network model to obtain a recognition result of a corresponding sequence, where the recognition result is used to indicate whether the road information belonging to the corresponding sequence is valid, and when the road information belonging to the corresponding sequence is valid, the road information belonging to the corresponding sequence is real road information; and updating map data by utilizing the road information belonging to the corresponding sequence if the road information belonging to the corresponding sequence is valid.

In a feasible design, before the inputting road information contained in each sequence in the at least one sequence into a pre-trained neural network model to obtain a recognition result of a corresponding sequence, the method further includes:

acquiring a sample set, where samples in the sample set include positive samples and negative samples, the positive samples are real road information, and the negative samples are false road information;

dividing the samples in the sample set to obtain at least one sample sequence, where samples belonging to the same sample sequence in the at least one sample sequence have the same type and occurrence location; and training an initial model according to the at least one sample sequence to obtain the neural network model.

In a feasible design, the training an initial model according to the at least one sample sequence to obtain the neural network model includes:

determining, for an $i^{th}$ sample sequence, a feature vector of each sample in the $i^{th}$ sample sequence in an embedding layer of the initial model, where the $i^{th}$ sample sequence is obtained according to any sample sequence of the at least one sample sequence;

learning, by utilizing a long-short-term memory recurrent neural network layer of the initial model, the feature vector of each sample in the $i^{th}$ sample sequence to obtain multiple context vectors, where each context vector of the multiple context vectors is used to indicate relationships among samples in the $i^{th}$ sample sequence; and training a Concatenate layer, a Fully Connected layer and a loss function layer of the initial model according to the multiple context vectors to obtain the neural network model.

In a feasible design, the training a Concatenate layer, a Fully Connected layer and a loss function layer of the initial model according to the multiple context vectors to obtain the neural network model includes:

concatenating the multiple context vectors in the Concatenate layer of the initial model to obtain a concatenating vector; and learning, by utilizing the concatenating vector, the Fully Connected layer and the loss function layer of the initial model to obtain the neural network model.

In a feasible design, the $i^{th}$ sample sequence is any sample sequence in the at least one sample sequence; or the $i^{th}$ sample sequence is a subsequence of any sample sequence in the at least one sample sequence.

In a feasible design, the determining, for an $i^{th}$ sample sequence, a feature vector of each sample in the $i^{th}$ sample sequence includes:

extracting at least one of an electronic device feature, a roadside unit RSU feature, and a road information feature corresponding to the each sample in the $i^{th}$ sample sequence, where the electronic device feature is used to characterize an electronic device that reports the each sample, the RSU feature is used to characterize an RSU that broadcasts the each sample to the electronic device, and the road information feature is used to characterize the each sample; and generating, for the each sample in the $i^{th}$ sample sequence, the feature vector of the each sample according to at least one of the electronic device feature, the RSU feature, and the road information feature corresponding to the each sample.

In a feasible design, the electronic device feature includes an identification of the electronic device, the number of times that the electronic device reports the each sample, or the number of times that the electronic device reports a valid sample, and the method further includes: de-duplicating the each sample reported by the electronic device to determine the number of times that the electronic device reports a non-repetitive sample; and de-duplicating the valid sample reported by the electronic device to determine the number of times that the electronic device reports a non-repetitive valid sample.

In a feasible design, the RSU feature includes an identification of the RSU, the total number of times that the RSU broadcasts the each sample, and the number of times that the RSU broadcasts the valid sample, and the method further includes: removing the number of times that the RSU repeatedly broadcasts the each sample from the total number of times that the RSU broadcasts the each sample; and removing the number of times that the RSU repeatedly broadcasts the valid sample from the number of times that the RSU broadcasts the valid sample.

In a feasible design, the road information feature includes at least one of the following features: a sample type, a sample location, a sample start time, a sample end time, and a time when the electronic device receives the each sample, and where the sample location is used to characterize a geographic location where the each sample occurs.

In a second aspect, an embodiment of the present application provides a map data updating apparatus, including:

a receiving module, configured to receive road information reported by an electronic device, where the road information is road information broadcast to the electronic device by a roadside unit;

a determining module, configured to determine at least one sequence according to the road information, where road information belonging to the same sequence in the at least one sequence has the same type and occurrence location;

a recognizing module, configured to input road information contained in each sequence in the at least one sequence into a pre-trained neural network model to obtain a recognition result of a corresponding sequence, where the recognition result is used to indicate whether the road information belonging to the corresponding sequence is valid, and when the road information belonging to the corresponding sequence is valid, the road information belonging to the corresponding sequence is real road information; and an updating module, configured to update map data by utilizing the road information belonging to the corresponding sequence if the road information belonging to the corresponding sequence is valid.

In a feasible design, the above-mentioned apparatus further includes:

a training module, configured to acquire a sample set before the recognizing module inputs the road information contained in each sequence in the at least one sequence into the pre-trained neural network model to obtain the recognition result of the corresponding sequence, where samples in the sample set include positive samples and negative samples, where the positive samples are real road information, and the negative samples are false road information; divide the samples in the sample set to obtain at least one sample sequence, where samples belonging to the same sample sequence in the at least one sample sequence have the same type and occurrence location; and train an initial model according to the at least one sample sequence to obtain the neural network model.

In a feasible design, when training the initial model according to the at least one sample sequence to obtain the neural network model, the training module is configured to determine, for an $i^{th}$ sample sequence, a feature vector of each sample in the $i^{th}$ sample sequence in an embedding layer of the initial model, where the $i^{th}$ sample sequence is obtained according to any sample sequence of the at least one sample sequence; learn, by utilizing a long-short-term memory recurrent neural network layer of the initial model, the feature vector of each sample in the $i^{th}$ sample sequence to obtain multiple context vectors, where each context vector of the multiple context vectors is used to indicate relationships among samples in the $i^{th}$ sample sequence; and train a Concatenate layer, a Fully Connected layer and a loss function layer of the initial model according to the multiple context vectors to obtain the neural network model.

In a feasible design, when training the Concatenate layer, the Fully Connected layer and the loss function layer of the initial model according to the multiple context vectors to obtain the neural network model, the training module is configured to concatenate the multiple context vectors in the Concatenate layer of the initial model to obtain a concatenating vector; and learn, by utilizing the concatenating vector, the Fully Connected layer and the loss function layer of the initial model to obtain the neural network model.

In a feasible design, the $i^{th}$ sample sequence is any sample sequence in the at least one sample sequence; or the $i^{th}$ sample sequence is a subsequence of any sample sequence in the at least one sample sequence.

In a feasible design, when determining, for the $i^{th}$ sample sequence, the feature vector of the each sample in the $i^{th}$ sample sequence, the training module is configured to extract at least one of an electronic device feature, a roadside unit RSU feature, and a road information feature corresponding to the each sample in the $i^{th}$ sample sequence, and generate, for the each sample in the $i^{th}$ sample sequence, the feature vector of the each sample according to at least one of the electronic device feature, the RSU feature, and the road information feature corresponding to the each sample, where the electronic device feature is used to characterize an electronic device that reports the each sample, the RSU feature is used to characterize an RSU that broadcasts the each sample to the electronic device, and the road information feature is used to characterize the each sample.

In a feasible design, the electronic device feature includes an identification of the electronic device, the number of times that the electronic device reports the each sample, or the number of times that the electronic device reports a valid sample, and the training module is further configured to de-duplicate the each sample reported by the electronic device to determine the number of times that the electronic device reports a non-repetitive sample, and de-duplicate the valid sample reported by the electronic device to determine the number of times that the electronic device reports a non-repetitive valid sample.

In a feasible design, the RSU feature includes an identification of the RSU, the total number of times that the RSU broadcasts the each sample, and the number of times that the RSU broadcasts the valid sample, and the training module is further configured to remove the number of times that the RSU repeatedly broadcasts the each sample from the total number of times that the RSU broadcasts the each sample, and remove the number of times that the RSU repeatedly broadcasts the valid sample from the number of times that the RSU broadcasts the valid sample.

In a feasible design, the road information feature includes at least one of the following features: a sample type, a sample location, a sample start time, a sample end time, and a time when the electronic device receives the each sample, and where the sample location is used to characterize a geographic location where the each sample occurs.

In a third aspect, an embodiment of the present application provides an electronic device, including:

at least one processor; and a memory communicatively connected with the at least one processor; where the memory stores instructions executable by the at least one processor, and the instructions are executed by the at least one processor to enable the at least one processor to execute the method according to the first aspect or any possible implementation of the first aspect.

In a fourth aspect, an embodiment of the present application provide a computer program product containing instructions, which when run on an electronic device, causes the electronic device to execute the method according to the foregoing first aspect or various possible implementations of the first aspect.

In a fifth aspect, an embodiment of the present application provides a non-transitory computer-readable storage medium storing computer instructions, where the computer instructions are used to cause a computer to execute the method according to the foregoing first aspect or various possible implementations of the first aspect.

In a sixth aspect, an embodiment of the present application provides a map data updating method, including: receiving road information reported by an electronic device, determining at least one sequence according to the road information, where road information belonging to the same sequence in the at least one sequence has the same type and occurrence location, and updating map data according to the at least one sequence.

The embodiments in the above application have the following advantages or beneficial effects: a server inputs each road information contained in the sequence into the neural network model, recognizes valid road information by combining context of each road information in the sequence and the neural network technology, and updates map data, thereby achieving the purpose of accurately updating the map data.

It should be understood that the content described in this section is not intended to identify key or important features of embodiments of the present application, nor is it intended to limit the scope of the present application. Other features of the present application will be easily understood by the following description.

BRIEF DESCRIPTION OF DRAWINGS

The attached drawings are used for a better understanding of the solutions and do not constitute a limitation of the present application. Among them.

DESCRIPTION OF EMBODIMENTS

Figure 1A:
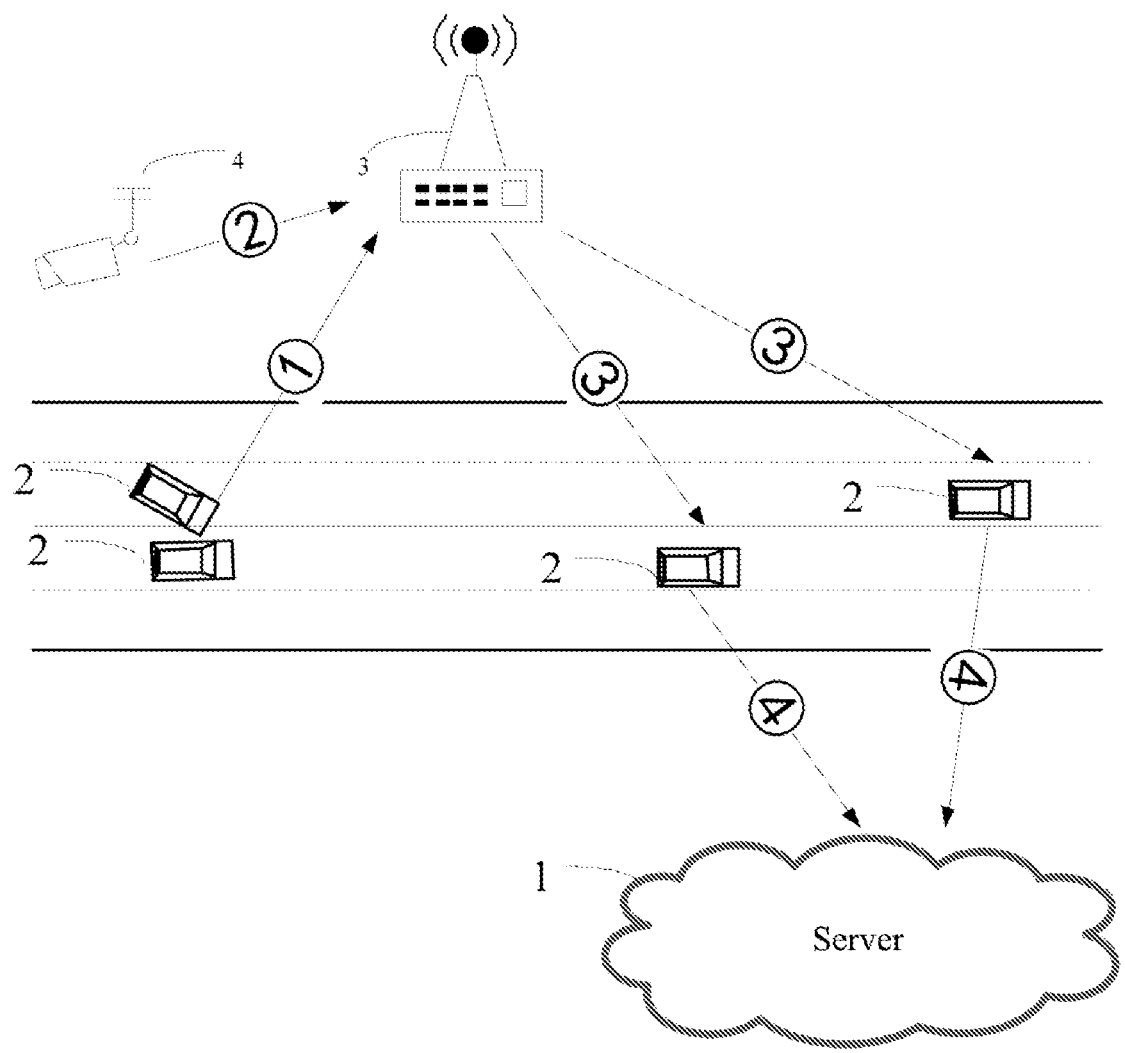
FIG. 1A is a schematic diagram of a network architecture of a map data updating method according to an embodiment of the present application.

Exemplary embodiments of the present application will be illustrated in combination with the accompanying drawings in the following, which include various details of the embodiments of the present application to facilitate understanding, and they should be considered as merely exemplary. Therefore, those of ordinary skill in the art should recognize that various changes and modifications can be made to the embodiments described herein without departing from the scope and spirit of the present application. Also, for clarity and conciseness, description of well-known functions and structures are omitted in the following description.

Vehicle to X (V2X) communication is a key technical direction of Internet of Vehicle. The V2X communication safely and efficiently realizes information exchanges of various elements in vehicles and transportation systems. At the same time, with the rapid development of cities and the increase in road complexity, users' requirements for electronic maps are becoming stronger and stronger. Map data is the basis of the electronic maps, mainly including road information, etc. The road information includes, for example, road construction, road closures, and occurrence of traffic accidents. Since the road information is not static, it is necessary to update the map data according to the road information.

Common map data updating methods include map data updating methods based on V2X, 5th generation (5G) or edge technology, which comprehensively, accurately and quickly recognize road information and update map data. Specifically, after multiple roadside units (RSUs) recognize road information; or, after a control center recognizes the road information and sends it to the RSUs, the RSUs broadcast the road information to an On board Unit (OBU). After receiving the road information, the OBU uploads the road information to a server. The server utilizes these road information to update the map data.

The road information is acquired by utilizing the V2X technology and reported to the server, the map data is updated by the server according to the road information.

The above map data updating methods do not consider a situation of malicious destruction of an On board device like an OBU. When the on board device is maliciously damaged, the damaged OBU may report invalid road information through means such as blocking, forgery, tampering. If the server fails to detect the invalid road information in time, then it will cause errors in map data updating. A problematic electronic map is generated based on incorrect map data. If a user utilizes such problematic electronic map to navigate, it is very likely that a navigation route will be wrong, which will increase the travel cost of the user.

Therefore, detection of invalid road information has become a key issue for the map data updating.

The embodiments of the present application provide a map data updating method, an apparatus, a device, and a readable storage medium, which, by recognizing valid road information, and updating map data utilizing the valid road information, achieves the purpose of accurately updating the map data.

First, terms involved in the embodiments of the present application are explained.

V2X: refers to wireless communication technology for vehicles, the technology can safely and efficiently realize information exchanges of various elements in vehicles and transportation systems. V represents vehicles, and X represents all objects that can perform information interaction with the vehicles, mainly including vehicles, persons, and traffic road test infrastructure such as RSUs, networks, and the like.

RSU: refers to roadside devices installed beside a road, the RSU is also referred to as a roadside unit. The RSU collects information of road, traffic and weather, the information is processed by the RSU itself; or, the RSU transmits these information to a control center to be processed by the control center. The processed information is broadcast to an OBU connected to the RSU, so as to realize an all-round connection among roads and vehicles, roads and persons, roads and cloud platforms. Among them, the cloud platforms are also referred to as cloud servers, servers, V2X platforms, etc.

OBU: is an On board device implementing V2X wireless communication. The OBU interacts with RSU, V2X platforms and other OBUs, and the like, by utilizing the V2X communication technology, which helps drivers obtain a current driving environment, so as to instruct the drivers to drive stably and safely under various complex situations.

Sequence: is also referred to as a V2X sequence, which is generated by a server according to road information uploaded by an electronic device such as an OBU. In a process of generating a sequence, the server categorizes and sorts multiple road information according to at least one of types, occurrence locations of the road information and a time point when the OBU receives the road information, thereby obtaining the sequence. Common road information includes road construction, road closures or occurrence of traffic accidents.

Next, a network architecture applied to the embodiments of the present application is illustrated in detail.

FIG. 1A is a schematic diagram of a network architecture of a map data updating method according to an embodiment of the present application. Referring to FIG. 1A, the network architecture includes: a server 1, electronic devices 2, a roadside unit 3, and a camera 4. Map data is stored in the server 1, and the electronic devices 2 are, for example, OBUs, mobile phones, notebooks, tablet computers, and the like, and FIG. 1A takes the OBUs as an example. The camera 4, for example, is a device installed on the roadside to take pictures of vehicles, pedestrians, and the like, on a road. Assuming that a vehicle collision accident occurs on the road, then collision information of an OBU of a vehicle that occurs a collision will be reported to an RSU, as shown by ① in the figure. Or, the camera 4 connected to the roadside unit 3 photographs the road, and sends collision information to the roadside unit 3, as shown by ② in the figure. The roadside unit 3 receives the collision information, recognizes the collision information to obtain road information, where the road information indicates that the vehicle on the road occurs a collision and the road is blocked.

After recognizing the road information, the roadside unit 3 broadcasts the road information to enable the electronic devices 2 connected to them to receive the road information, as shown by ③ in the figure. The electronic devices 2 send the received road information to the server 1, as shown by ④ in the figure. The server 1 generates a sequence according to the received road information, and inputs road information contained in the sequence into a pre-trained neural network model, thereby recognizing whether the road information indicated by the sequence is valid. If the road information is valid, the map data is updated by utilizing the valid road information.

Figure 1B:
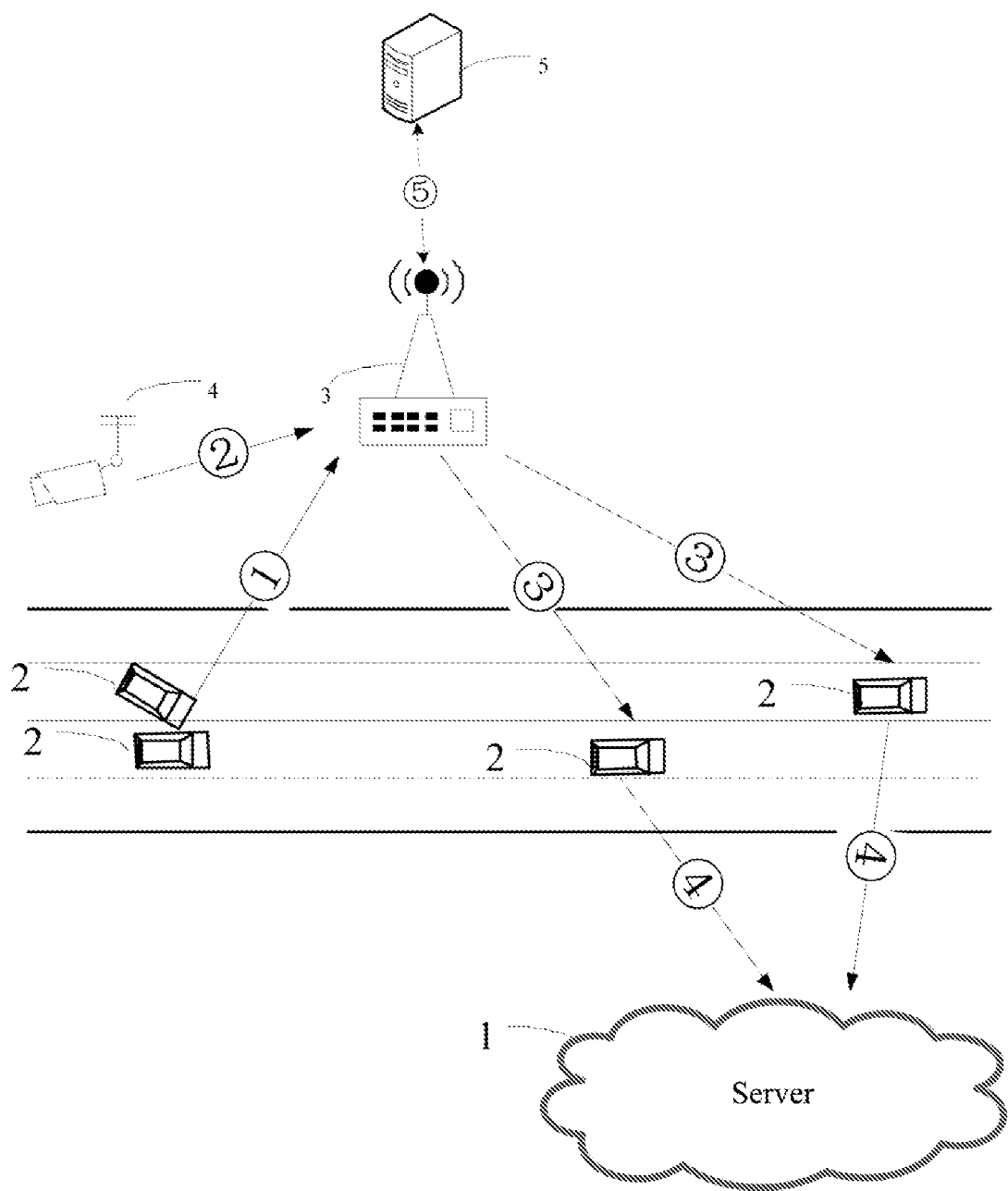
FIG. 1B is a schematic diagram of another network architecture of a map data updating method according to an embodiment of the present application.

FIG. 1B is a schematic diagram of another network architecture of a map data updating method according to an embodiment of the present application. Compared with the architecture shown in FIG. 1A, this network architecture further includes a control center 5, the control center 5 is configured to control the RSU 3. After the RSU receives the collision information sent by the electronic devices 2 or the collision information sent by the camera 4, the RSU sends the collision information to the control center 5. As shown by ⑤ in the figure, after receiving the collision information, the control center recognizes the collision information to obtain road information, which indicates that the vehicle on the road occurs a collision and the road is blocked. After that, the control center 5 sends the road information to the roadside unit 3, and the roadside unit 3 broadcasts the road information.

Hereinafter, the map data updating method described in the embodiments of the present application is illustrated in detail based on the above-mentioned term explanations and the network architectures shown in FIG. 1A and FIG. 1B. Exemplary, reference is made to FIG. 2.

Figure 2:
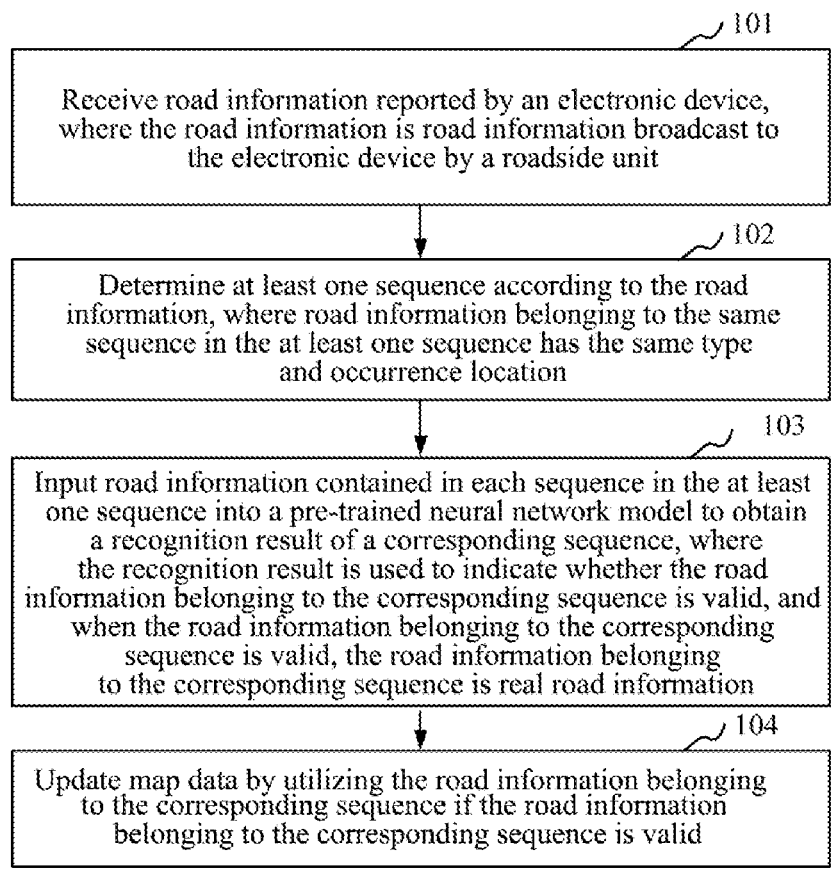
FIG. 2 is a flowchart of a map data updating method according to an embodiment of the present application.

FIG. 2 is a flowchart of a map data updating method according to an embodiment of the present application. The execution subject of this embodiment is an electronic device, which is, for example, the server in FIG. 1A and FIG. 1B. This embodiment includes:

101: receive road information reported by an electronic device, where the road information is road information broadcast to the electronic device by a roadside unit.

Referring to FIG. 1A and FIG. 1B, the electronic device is, for example, the electronic device that receives broadcast information from the RSU. The electronic device sends the received road information to the server, as shown by ④ in FIG. 1A and FIG. 1B.

102: determine at least one sequence according to the road information, where road information belonging to the same sequence in the at least one sequence has the same type and occurrence location.

After receiving the road information, the server obtains at least one sequence according to a type and an occurrence location of each road information. For example, the road information received by the server includes road information a to road information e, where a type of road information a is collision, a location is location A, and a time point is T1; a type of road information b is collision, a location is location A, and a time point is T2; a type of road information c is collision, a location is location A, and a time point is T3; a type of road information d is blockage, a location is location B, and a time point is T4; a type of road information e is blockage, a location is location B, and a time point is T5. Then, the server generates two sequences based on these road information, namely sequence 1: [road information a, road information b, road information c], and sequence 2: [road information d, road information e].

103: input road information contained in each sequence in the at least one sequence into a pre-trained neural network model to obtain a recognition result of a corresponding sequence, where the recognition result is used to indicate whether the road information belonging to the corresponding sequence is valid, and when the road information belonging to the corresponding sequence is valid, the road information belonging to the corresponding sequence is real road information.

Exemplary, a trained neural network model is pre-deployed on the server. The server sequentially inputs the road information contained in each sequence into the neural network model, and the neural network model learns the road information contained in this sequence to obtain an output result, which is used to indicate whether the road information belonging to this sequence is valid. For example, the server inputs sequence 1: [road information a, road information b, road information c] into the neural network model, the neural network model extracts a feature vector for each road information in sequence 1, and learns these feature vectors to obtain an output result. When the output result is 0, it means that the road information a, the road information b and the road information c are invalid. When the output result is 1, it means that the road information a, the road information b and the road information c are valid.

104: update map data by utilizing the road information belonging to the corresponding sequence if the road information belonging to the corresponding sequence is valid.

Exemplary, after determining valid road information, the server updates the valid road information into the map data. When a user uses an electronic map, the server sends updated map data to an electronic device of the user, so that the electronic device of the user displays a map based on the updated map data, and performs navigation for the user.

In the map data updating method provided by the embodiment of the present application, after receiving the road information reported by the electronic device, the server obtains multiple sequences according to the road information, where each road information belonging to the same sequence has the same type and location. After that, the server inputs each road information contained in the sequence into the pre-trained neural network model, so that the neural network model outputs the recognition result according to the sequence. If the recognition result indicates that the road information belonging to the sequence is valid, then the server updates the map data by utilizing the valid road information. With this solution, the server inputs each road information contained in the sequence into the neural network model, recognizes valid road information by combining context of each road information in the sequence and the neural network technology, and updates the map data, thereby achieving the purpose of accurately updating the map data.

The embodiments of the present application are roughly divided into three stages: a pre-training model stage, a stage that utilizes the model to perform an online prediction, and a map data updating stage. In the following, these stages will be illustrated in detail, respectively.

First, the pre-training model stage.

In the above-mentioned embodiment, before the road information contained in each sequence in the at least one sequence is input into the pre-trained neural network model to obtain the recognition result of the corresponding sequence, the neural network model is further trained.

In a process of training the neural network model, the server first acquires a sample set, and samples in the sample set include positive samples and negative samples, where the positive samples are real road information, and the negative samples are false road information. Then, the server divides the samples in the sample set to obtain at least one sample sequence. Samples belonging to the same sample sequence in the at least one sample sequence have the same type and occurrence location. Finally, the server trains an initial model according to the at least one sample sequence to obtain the neural network model.

Exemplary, the positive samples and the negative samples are labeled from multiple samples in advance through manners such as manual labeling. After that, these samples are divided. In a division process, the server divides samples of the same type and location into a group. Next, for samples belonging to the same group, the server sorts these samples according to a receiving time of each sample, thereby obtaining a sequence. For example, road information divided into a group includes that: the type of the road information a is collision, the location is location A, and the time point is T1; the type of the road information b is collision, the location is location A, and the time point is T2; the type of the road information c is collision, the location is location A, and the time point is T3. The three road information has the same type and location, but the time points when the electronic device receives the road information are different. Among them, T1, T2, and T3 are time points when the same electronic device or different electronic devices receive the road information, and a sequential order is T2, T1 and T3. Therefore, the sequence is [road information b, road information a, road information c].

Finally, the server trains the initial model according to the at least one sample sequence, and continuously optimizes parameters and the like of the initial model until the initial model reaches an optimal state, then the model with the optimal state is used as the trained neural network model.

With this solution, after acquiring the samples reported by the electronic device, the server sorts the samples according to the type of each sample, the occurrence location of each sample, and the time point when the electronic device receives each sample, thereby achieving the purpose of acquiring the sample sequence.

Figure 3:
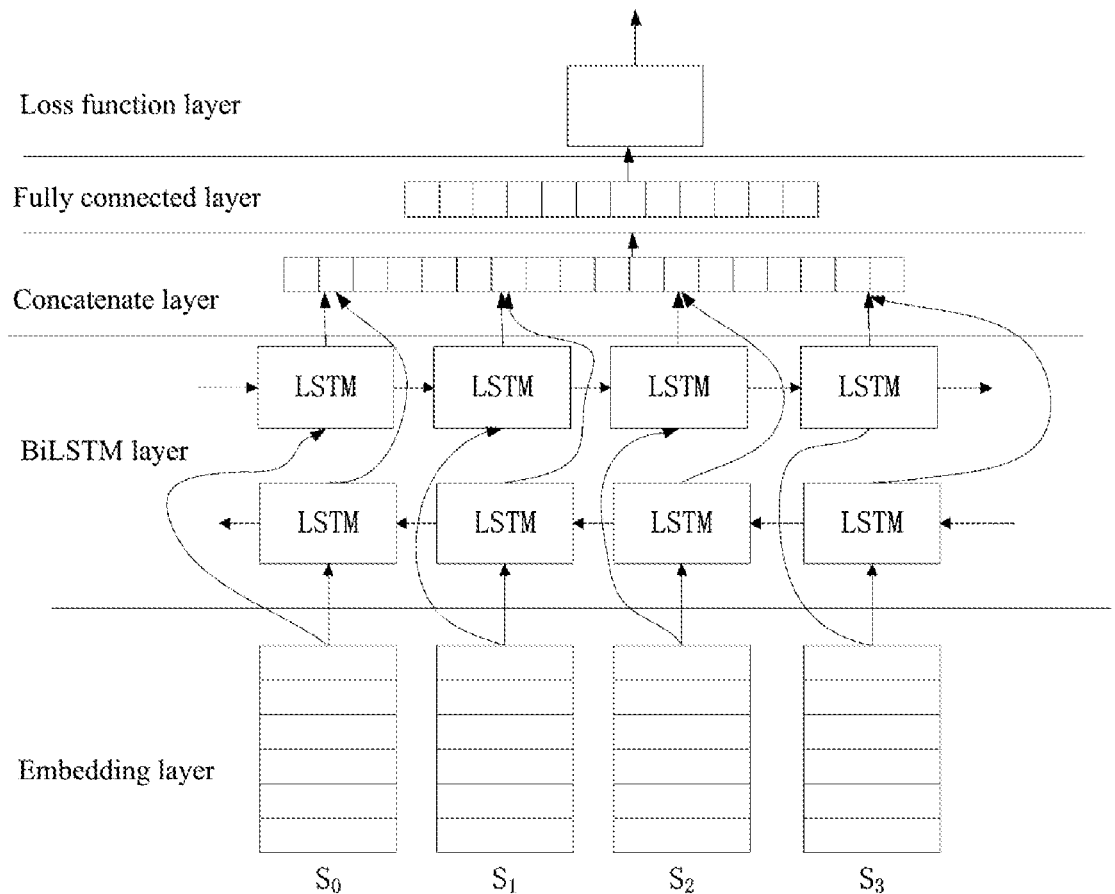
FIG. 3 is a schematic diagram of model training in a map data updating method according to an embodiment of the present application.

FIG. 3 is a schematic diagram of model training in a map data updating method according to an embodiment of the present application. Referring to FIG. 3, the initial model contains five layers, namely an Embedding layer, a Bi-directional Long Short-Term Memory Recurrent Neural Network (BiLSTM) layer, a Concatenate layer, a Fully connected (FC) layer and a loss function layer, a loss function is, for example, softmax.

Referring to FIG. 3, the server sorts the samples to obtain at least one sequence, and the at least one sequence forms a sequence set S. After that, any sample sequence $S_i$ in the sequence set 5, hereinafter is referred to as an $i^{th}$ sample sequence. The $i^{th}$ sample sequence is obtained according to any sample sequence in the at least one sample sequence. For example, the $i^{th}$ sample sequence is any sample sequence in the at least one sample sequence; for another example, the $i^{th}$ sample sequence is a subsequence of any sample sequence in the at least one sample sequence. It is assumed that the $i^{th}$ sample sequence $S_i$ contains $N_{S_i}$ samples, and $N_{S_i} \geq 1$ and is an integer. The server extracts multiple consecutive samples to form a subsequence. Assuming that samples contained in the subsequence contains are sample $s_0$, sample $s_1$, sample $s_2$, and sample $s_3$, then the subsequence is expressed as: $\{s_0, s_1, s_2, s_3\}$.

With this solution, when the number of samples is relatively small, the number of sequences is expanded by means of extracting subsequences, which improves the accuracy of model training.

After obtaining the sequence set S, the server inputs road information contained in the $i^{th}$ sample sequence into the Embedding layer of the initial model, so that the Embedding layer extracts a feature vector of each sample in the $i^{th}$ sample sequence, and inputs the extracted feature vector into the BiLSTM layer. For example, if the $i^{th}$ sample sequence $S_i$ is $\{s_0, s_1, s_2, s_3\}$, then the Embedding layer extracts respective feature vectors of sample $s_0$, sample $s_1$, sample $s_2$, and sample $s_3$. The extracted feature vectors are input into the BiLSTM layer.

In the BiLSTM layer, the server learns the feature vector of each sample in the $i^{th}$ sample sequence by utilizing the long short-term memory recurrent neural network layer of the initial model to obtain multiple context vectors, where each context vector of the multiple context vectors is used to indicate relationships among samples in the $i^{th}$ sample sequence.

Exemplary, BiLSTM consists of forward LSTM and backward LSTM, and is usually used to model context information. After the feature vector of each sample of the $i^{th}$ sample sequence $S_i$ are input into the BiLSTM layer, the BiLSTM layer obtains the multiple context vectors by utilizing context of each sample of the $i^{th}$ sample sequence $S_i$. Each context vector of these context vectors carries relationships among samples. The server trains the Concatenate layer, the Fully Connected layer and the loss function layer of the initial model according to the multiple context vectors to obtain the neural network model.

Exemplary, a loss function corresponding to the loss function layer is, for example, softmax. The server continuously adjusts parameters of the Concatenate layer, the Fully Connected layer and the loss function layer of the initial model according to the multiple context vectors, so that the parameters of the Concatenate layer, the Fully Connected layer and the loss function layer of the initial model are optimal, and the optimal initial model is used as the neural network model.

With this solution, the server takes the samples in the $i^{th}$ sample sequence $S_i$ in the sequence set S as input, and continuously trains and optimizes the initial model, thereby achieving the purpose of obtaining the neural network model.

When training the Concatenate layer, the Fully Connected layer and the loss function layer of the initial model according to the multiple context vectors to obtain the neural network model, the server first concatenates the multiple context vectors in the Concatenate layer of the initial model to obtain a concatenating vector; then, learns the Fully Connected layer and the loss function layer of the initial model by utilizing the concatenating vector to obtain the neural network model.

Exemplary, reference is made to FIG. 3 again, the BiLSTM layer outputs the multiple context vectors, and these vectors are input into the Concatenate layer. The Concatenate layer concatenates all the context vectors output by the BiLSTM layer to obtain a concatenating vector. The concatenating vector is input into the FC layer. After the concatenating vector is processed by the FC layer and the softmax layer, the parameters of each layer of the initial model are adjusted.

With this solution, the purpose of adjusting the parameters of the Concatenate layer, the FC layer and the softmax layer of the initial model is realized.

Second, the stage that utilizes the model to perform the online prediction.

In a process of predicting whether the road information is valid after the neural network model is trained, the server receives the road information reported by the electronic device, such as the OBU, and sorts the received road information according to the types and the locations of the road information, so as to acquire multiple sequences. After that, the road information contained in the sequences is input into the pre-trained neural network model to judge whether the road information belonging to the sequences is valid.

In the judgment process, the Embedding layer of the neural network model extracts a feature of each road information in the sequences to obtain the feature vector of each road information, and these feature vectors are input into the BiLSTM layer. After that, the BiLSTM layer learns the feature vectors and obtains multiple context vectors containing context information. The Concatenate layer concatenates these context vectors to obtain the concatenating vector. Finally, after the concatenating vector is processed by the FC layer and the Softmax layer, a recognition result can be obtained. The recognition result is used to indicate whether the road information of a certain type and a certain location is valid.

Finally, the map data updating stage.

In this stage, after obtaining the valid road information, the server extracts information such as a Global Positioning System (GPS) location and a type of the road information, and updates the map data according to the extracted information.

Figure 4:
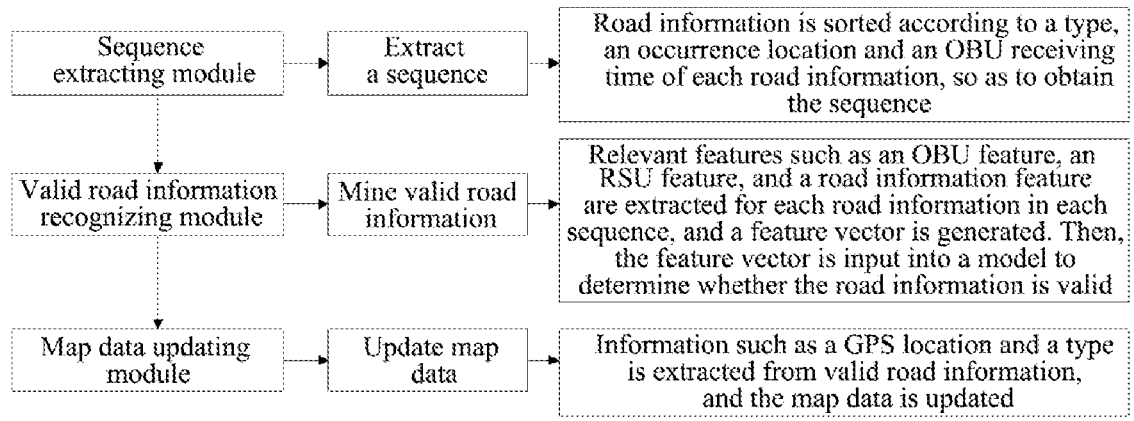
FIG. 4 is a process schematic diagram of a map data updating method according to an embodiment of the present application.

The aforementioned stage that utilizes the model to perform the online prediction and the map data updating stage can be shown in FIG. 4 as follows. FIG. 4 is a process schematic diagram of a map data updating method according to an embodiment of the present application.

Referring to FIG. 4, the server is provided with a sequence extracting module, a valid road information recognizing module and a map data updating module, where the sequence extracting module is configured to extract sequences, for example, sort road information according to a type, an occurrence location and an OBU receiving time of each road information, so as to obtain the sequences.

The valid road information recognizing module: is configured to mine valid road information. During a mining process, relevant features such as an OBU feature, an RSU feature, and a road information feature is extracted for each road information in each sequence, and a feature vector is generated. Then, the feature vector is input into a model to determine whether the road information is valid.

The map data updating module: is configured to update map data. For example, information such as a GPS location and a type is extracted from valid road information, and the map data is updated.

In the following, how does the server determine the feature vector of each sample in the $i^{th}$ sample sequence in the foregoing embodiment will be described in detail.

For each sample of the $i^{th}$ sample sequence $S_i$ in the sequence set S, the server extracts at least one of an electronic device feature, a roadside unit RSU feature, and a road information feature corresponding to each sample, the electronic device feature is used to characterize an electronic device that reports the each sample, the RSU feature is used to characterize an RSU that broadcasts the each sample to the electronic device, and the road information feature is used to characterize the each sample. Then, the server generates the feature vector of the each sample according to at least one of the electronic device feature, the RSU feature, and the road information feature of the sample.

Exemplary, for each sample, the server extracts the electronic device feature (for example, an OBU feature), the RSU feature, the road information feature, and the like, thereby generating a feature vector of this sample. In the following, the electronic device feature, the RSU feature and the road information feature are respectively described in detail.

First, the electronic device feature.

The electronic device feature is used to characterize the electronic device that reports the each sample, and includes an electronic device identification oid, the number of times that the electronic device reports the each sample $N_o$, and the number of times that the electronic device reports a valid sample $N_o^v$.

A: the electronic device identification oid.

For each electronic device, the server randomly generates a vector $R_o^k$ with a dimension of k, this vector $R_o^k$ obeys a normal distribution N(0,1), and k is 32, for example. This vector $R_o^k$ is used to represent the identification oid of the electronic device.

B: The number of times that the electronic device reports the each sample $N_o$ and the number of times that the electronic device reports the valid sample $N_o^v$.

The server counts offline the number of times that the electronic device historically reports the road information, and this number of times is the number of times that the electronic device reports the each sample $N_o$. The server also counts offline the number of times that the electronic device historically reports valid road information, and the number of times is the number of times that the electronic device reports the valid sample N.

After counting the number of times that the electronic device reports the each sample $N_o$ and the number of times that the electronic device reports the valid sample $N_o^v$, the server de-duplicates the each sample reported by the electronic device to determine the number of times that the electronic device reports a non-repetitive sample; and de-duplicates the valid sample reported by the electronic device to determine the number of times that the electronic device reports a non-repetitive valid sample.

Exemplary, since the electronic device may receive road information from different RSUs, however, the road information broadcasted by the different RSUs may be the same. Therefore, the same road information needs to be de-duplicated, and only one of the multiple duplicate road information is retained, and the rest are deleted. At the same time, the number of times that the electronic device reports the each sample $N_o$ is adjusted according to the number of deleted samples, and the number of times that the electronic device reports the valid sample $N_o^v$ is adjusted according to the number of deleted valid samples.

After de-duplication, the server utilizes Z-score to standardize the number of times that the electronic device reports the each sample $N_o$, so that the number of times that the electronic device reports the each sample $N_o$ obeys a normal distribution N(0,1).

The server utilizes Z-score to standardize the number of times that the electronic device reports the valid sample $N_o^v$, so that the number of times that the electronic device reports the samples $N_o^v$ obeys a normal distribution N(0,1).

With this solution, the samples and the valid samples reported by the electronic device are de-duplicated to ensure the unity of the samples, and then the accuracy of the model is improved.

Second, the RSU feature.

The RSU feature is used to characterize the RSU that broadcasts the each sample to the electronic device, and includes at least one of an RSU identification rid, the total number of times that the RSU broadcasts the each sample $N_r$, and the valid number of times that the RSU broadcasts the valid sample $N_r^v$.

C: the identification rid of the RSU.

For each RSU, the server randomly generates a vector $R_r^k$ with a dimension of k, this vector $R_r^k$ obeys a normal distribution N(0,1), and k is 32, for example. This vector $R_r^k$ is used to represent the identification rid of the RSU.

D: the total number of times that the RSU broadcasts the each sample $N_r$ and the number of times that the RSU broadcasts the valid sample $N_r^v$.

The server counts offline the number of times that the RSU transmits road information to the electronic device such as the OBU, and this number of times is the total number of times that the RSU sends the each sample $N_r$. The server also counts offline the number of times that the RSU sends the valid road information to the OBU, and this number of times is the number of times that the RSU broadcasts the valid sample $N_r^v$.

After determining the total number of times that the RSU broadcasts the each sample $N_r$ and the number of times that the RSU broadcasts the valid sample $N_r^v$, the server further removes the number of times that the RSU repeatedly broadcasts the each sample from the total number of times that the RSU broadcasts the each sample, and removes the number of times that the RSU repeatedly broadcasts the valid sample from the number of times that the RSU broadcasts the valid number.

Exemplary, since the RSU may broadcast the same road information for multiple times, it is necessary to subtract the number of times of repeatedly broadcasting the same sample from the total number of times $N_r$, and remove the number of times of repeatedly broadcasting the same valid sample from the number of times $N_r^v$ that the RSU broadcasts the valid sample.

After de-duplication, the server utilizes Z-score to standardize the total number of times that the RSU broadcasts the each sample $N_r$, so that the total number of times that the RSU broadcasts the each sample $N_r$ obeys a normal distribution N(0,1).

The server utilizes Z-score to standardize the number of times that the RSU broadcasts the valid sample $N_r^v$, so that the number of times that the RSU broadcasts the valid sample $N_r^v$ obeys a normal distribution N(0,1).

With this solution, the total number of times that the RSU broadcasts the each sample $N_r$ and the number of times that the RSU broadcasts the valid sample $N_r^v$ are de-duplicated to ensure the unity of the samples, and then the accuracy of the model is improved.

Finally, the road information feature.

In the embodiment of the present application, the road information feature is used to characterize the road information, and the road information feature includes at least one of the following features: a sample type $T_i$, a sample location $I_s$, a sample start time $t_s$, a sample end time $t_e$, and a time $t_r$ when the electronic device receives the each sample, where the sample location $I_s$ is used to characterize a geographic location where the each sample occurs.

E: the sample type T.

For each road information, the server randomly generates a vector 4 with a dimension of k, this vector $R_t^k$ obeys a normal distribution N(0,1), and k is 32, for example. This vector $R_t^k$ is used to represent the sample type $T_i$.

F: the sample start time 6.

The sample start time $t_s$ is used to characterize a time point when the road information occurs. In order to ensure the continuity of time, the sample start time $t_e$ is represented by two characteristics after sine and cosine revolution. That is, the sample start time $t_s$ is expressed as:

$$\cos\left(\frac{2\pi}{24\times 60\times 60}\times t_s\right) \text{ and } \sin\left(\frac{2\pi}{24\times 60\times 60}\times t_s\right).$$

G: the sample end time $t_e$.

The sample end time $t_e$ is used to characterize a time point when the road information ends. In order to ensure the continuity of time, the sample end time 6 is consistent with the sample start time $t_s$, and is also represented by two characteristics after sine and cosine revolution. That is, the sample end time 6 is expressed as:

$$\cos\left(\frac{2\pi}{24\times 60\times 60}\times t_e\right)$$

and $$\sin\left(\frac{2\pi}{24\times 60\times 60}\times t_e\right).$$

H: the time $t_r$ when the electronic device receives the each sample.

The time $t_r$ when the electronic device receives the each sample is used to characterize a time point when the electronic device such as the OBU receives the road information broadcast by the RSU. In order to ensure the continuity of time, the time $t_r$ when the electronic device receives the each sample is consistent with the sample end time $t_e$ and the sample start time $t_s$, which are also represented by two characteristics after sine and cosine revolution. That is, the time $t_r$ when the electronic device receives the each sample is expressed as:

$$\cos\left(\frac{2\pi}{24\times 60\times 60}\times t_r\right)$$

and $$\sin\left(\frac{2\pi}{24\times 60\times 60}\times t_r\right).$$

I: the sample location $I_s$.

The sample location $I_s$ is used to characterize the geographic location where the each sample occurs. In order to improve the generalization ability of location feature, a national map is divided into a set of square grids L with a side length of 100 meters, and monotonically increasing integers are used to identify the grids from top to bottom and from left to right. After that, the grids are standardized utilizing Z-score to make them obey a normal distribution N(0,1).

When determining a grid location of the road information, that is, the sample location $I_s$, the server determines a grid where the road information is located according to GPS information of a location where the information occurs, and then a value corresponding to the grid is acquired.

The foregoing describes specific implementations of the map data updating method mentioned in the embodiments of the present application. The following are apparatus embodiments of the present application, which can be used to implement the method embodiments of the present application. For details not disclosed in the apparatus embodiments of the present application, reference is made to the method embodiments of the present application.

Figure 5:
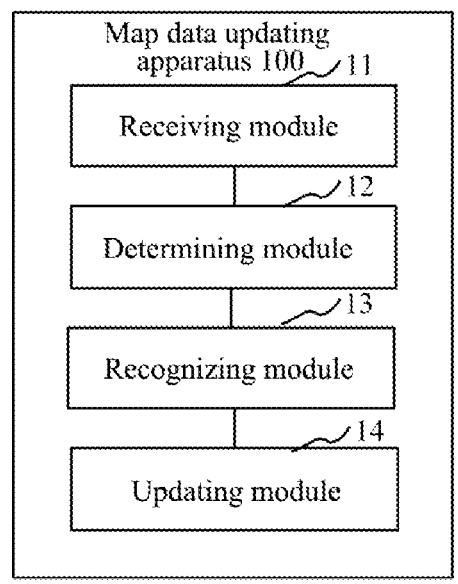
FIG. 5 is a schematic structural diagram of a map data updating apparatus according to an embodiment of the present application.

FIG. 5 is a schematic structural diagram of a map data updating apparatus according to an embodiment of the present application. The apparatus can be integrated in a server or implemented by a server. As shown in FIG. 5, in this embodiment, the map data updating apparatus 100 may include: a receiving module 11, a determining module 12, a recognizing module 13, and an updating module 14.

The receiving module 11 is configured to receive road information reported by an electronic device, where the road information is road information broadcast to the electronic device by a roadside unit;

the determining module 12 is configured to determine at least one sequence according to the road information, where road information belonging to the same sequence in the at least one sequence has the same type and occurrence location;

the recognizing module 13 is configured to input road information contained in each sequence in the at least one sequence into a pre-trained neural network model to obtain a recognition result of a corresponding sequence, where the recognition result is used to indicate whether the road information belonging to the corresponding sequence is valid, and when the road information belonging to the corresponding sequence is valid, the road information belonging to the corresponding sequence is real road information; and the updating module 14 is configured to update map data by utilizing the road information belonging to the corresponding sequence if the road information belonging to the corresponding sequence is valid.

Figure 6:
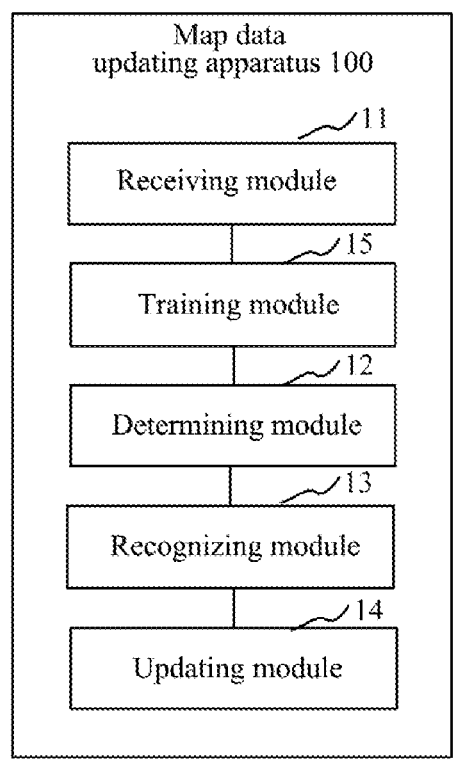
FIG. 6 is a schematic structural diagram of another map data updating apparatus according to an embodiment of the present application.

FIG. 6 is a schematic structural diagram of another map data updating apparatus according to an embodiment of the present application. As shown in FIG. 6, the map data updating apparatus 100 provided in this embodiment, on the basis of the above-mentioned FIG. 5, further includes:

a training module 15, configured to acquire a sample set before the recognizing module 13 inputs the road information contained in each sequence in the at least one sequence into the pre-trained neural network model to obtain the recognition result of the corresponding sequence, where samples in the sample set include positive samples and negative samples, where the positive samples are real road information, and the negative samples are false road information; divide the samples in the sample set to obtain at least one sample sequence, where samples belonging to the same sample sequence in the at least one sample sequence have the same type and occurrence location; and train an initial model according to the at least one sample sequence to obtain the neural network model.

In a feasible design, when training the initial model according to the at least one sample sequence to obtain the neural network model, the training module 15 is configured to determine, for an $i^{th}$ sample sequence, a feature vector of each sample in the $i^{th}$ sample sequence in an embedding layer of the initial model, where the $i^{th}$ sample sequence is obtained according to any sample sequence of the at least one sample sequence; learn, by utilizing a long-short-term memory recurrent neural network layer of the initial model, the feature vector of each sample in the $i^{th}$ sample sequence to obtain multiple context vectors, where each context vector of the multiple context vectors is used to indicate relationships among samples in the $i^{th}$ sample sequence; and train a Concatenate layer, a Fully Connected layer and a loss function layer of the initial model according to the multiple context vectors to obtain the neural network model.

In a feasible design, when training the Concatenate layer, the Fully Connected layer and the loss function layer of the initial model according to the multiple context vectors to obtain the neural network model, the training module 15 is configured to concatenate the multiple context vectors in the Concatenate layer of the initial model to obtain a concatenating vector; and learn, by utilizing the concatenating vector, the Fully Connected layer and the loss function layer of the initial model to obtain the neural network model.

In a feasible design, the $i^{th}$ sample sequence is any sample sequence in the at least one sample sequence; or the $i^{th}$ sample sequence is a subsequence of any sample sequence in the at least one sample sequence.

In a feasible design, when determining, for the $i^{th}$ sample sequence, the feature vector of the each sample in the $i^{th}$ sample sequence, the training module is configured to extract at least one of an electronic device feature, a roadside unit RSU feature, and a road information feature corresponding to the each sample in the $i^{th}$ sample sequence, and generate, for the each sample in the $i^{th}$ sample sequence, the feature vector of the each sample according to at least one of the electronic device feature, the RSU feature, and the road information feature corresponding to the each sample, where the electronic device feature is used to characterize an electronic device that reports the each sample, the RSU feature is used to characterize an RSU that broadcasts the each sample to the electronic device, and the road information feature is used to characterize the each sample.

In a feasible design, the electronic device feature includes an identification of the electronic device, the number of times that the electronic device reports the each sample, or the number of times that the electronic device reports a valid sample, and the training module is further configured to de-duplicate the each sample reported by the electronic device to determine the number of times that the electronic device reports a non-repetitive sample, and de-duplicate the valid sample reported by the electronic device to determine the number of times that the electronic device reports a non-repetitive valid sample.

In a feasible design, the RSU feature includes an identification of the RSU, the total number of times that the RSU broadcasts the each sample, and the number of times that the RSU broadcasts the valid sample, and the training module is further configured to remove the number of times that the RSU repeatedly broadcasts the each sample from the total number of times that the RSU broadcasts the each sample, and remove the number of times that the RSU repeatedly broadcasts the valid sample from the number of times that the RSU broadcasts the valid sample.

In a feasible design, the road information feature includes at least one of the following features: a sample type, a sample location, a sample start time, a sample end time, and a time when the electronic device receives the each sample, and where the sample location is used to characterize a geographic location where the each sample occurs.

The map data updating apparatus provided in the embodiments of the present application can be used in the methods executed by the server in the above embodiments, and implementation principles and technical effects thereof are similar, which will not be repeated herein.

According to the embodiments of the present application, the present application further provides an electronic device and a readable storage medium.

Figure 7:
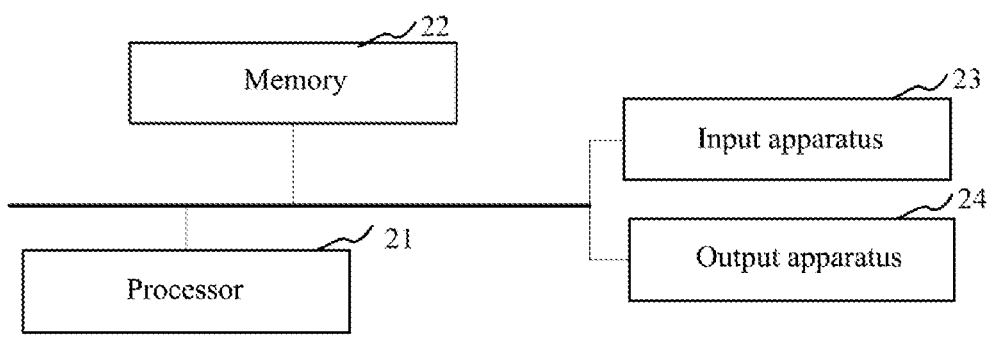
FIG. 7 is a block diagram of an electronic device for implementing the map data updating method according to an embodiment of the present application.

FIG. 7 is a block diagram of an electronic device for implementing the map data updating method according to an embodiment of the present application. The electronic device is intended to represent various forms of digital computers, such as laptop computer, desktop computer, workstation, personal digital assistant, server, blade server, mainframe computer, and other suitable computers. The electronic device may also represent various forms of mobile apparatuses, such as personal digital assistant, cellular phone, smart phone, wearable device and other similar computing apparatuses. The components shown herein, their connections and relationships, and their functions are merely examples, and are not intended to limit the implementations of the present application described and/or claimed herein.

As shown in FIG. 7, the electronic device includes: one or more processors 21, a memory 22, and interfaces for connecting various components, including high-speed interfaces and low-speed interfaces. The various components are interconnected using different buses, and can be mounted on a common motherboard or otherwise installed as required. The processor may process instructions executed within the electronic device, including instructions stored in or on the memory to display graphical information of Graphical User Interface (GUI) on an external input/output apparatus, such as a display device coupled to an interface. In other implementations, a plurality of processors and/or a plurality of buses may be used together with a plurality of memories, if desired. Similarly, a plurality of electronic devices can be connected, and each device provides part of necessary operations (for example, as a server array, a group of blade servers, or a multi-processor system). One processor 21 is taken as an example in FIG. 7.

The memory 22 is a non-transitory computer-readable storage medium provided by the present application. The memory stores instructions executable by at least one processor, so that the at least one processor executes the map data updating method provided by the present application. The non-transitory computer-readable storage medium of the present application stores computer instructions, the computer instructions are used to cause a computer to execute the map data updating method provided by the present application.

As a non-transitory computer-readable storage medium, the memory 22 may be configured to store non-transitory software programs, non-transitory computer-executable programs and modules, such as program instructions/modules corresponding to the map data updating method in the embodiments of the present application (for example, the receiving module 11, the determining module 12, the recognizing module 13, and the updating module 14 shown in FIG. 5, and the training module 15 shown in FIG. 6). The processor 21 executes various functional applications and data processing of the server by running non-transitory software programs, instructions and modules stored in the memory 22, that is, the map data updating method in the above-mentioned method embodiments are realized.

The memory 22 may include a storage program area and a storage data area, where the storage program area may store an operating system and at least one application program required for functions; the storage data area may store data created according to the use of the electronic device of the map data updating method, and the like. In addition, the memory 22 may include high-speed random access memory, and may also include non-transitory memory, such as at least one magnetic disk memory device, flash memory device, or other non-transitory solid-state memory devices. In some embodiments, the memory 22 may include memories remotely disposed with respect to the processor 21, and these remote memories may be connected to the electronic device implementing the map data updating method through a network. Examples of the above-mentioned network include, but are not limited to, an Internet, an Intranet, a local area network, a mobile communication network and combination thereof.

The electronic device for implementing the map data updating method may further include: an input apparatus 23 and an output apparatus 24. The processor 21, the memory 22, the input apparatus 23, and the output apparatus 24 may be connected through a bus or other means. In FIG. 7, a connection through a bus is taken as an example.

The input apparatus 23 may receive input numeric or character information, and generate key signal inputs related to user settings and function control of electronic device for implementing map data updating method, for example input apparatus such as touch screen, keypad, mouse, track pad, touch pad, pointing stick, one or more mouse buttons, trackball, joystick. The output apparatus 24 may include a display device, an auxiliary lighting apparatus (e.g., an LED), a haptic feedback apparatus (e.g., a vibration motor), and the like. The display device may include, but is not limited to, a liquid crystal display (LCD), a light-emitting diode (LED) display, and a plasma display. In some implementations, the display device may be a touch screen.

Various implementations of the systems and technologies described herein may be implemented in a digital electronic circuit system, an integrated circuit system, an application-specific ASIC (application-specific integrated circuit), computer hardware, firmware, software, and/or combination thereof. These various implementations may include: being implemented in one or more computer programs, the one or more computer programs are executable and/or interpreted on a programmable system including at least one programmable processor, the programmable processor may be a dedicated or general-purpose programmable processor that may receive data and instructions from a storage system, at least one input device, and at least one output device, and transmit data and instructions to the storage system, at least one input apparatus, and at least one output apparatus.

These computer programs (also known as programs, software, software applications, or codes) include machine instructions of a programmable processor, and can be implemented by using high-level procedures and/or object-oriented programming languages, and/or assembly/machine languages. As used herein, the terms "machine-readable medium" and "computer-readable medium" refer to any computer program product, device, and/or apparatus used to provide machine instructions and/or data to a programmable processor (e.g., a magnetic disk, an optical disk, a memory, a programmable logic device (PLD)), including machine-readable medium that receive machine instructions as machine-readable signals. The term "machine-readable signal" refers to any signal used to provide machine instructions and/or data to a programmable processor.

To provide interaction with the user, the systems and technologies described herein can be implemented on a computer having: a display apparatus (e.g., a CRT (cathode ray tube) or LCD (liquid crystal display) monitor) for displaying information to the user; and a keyboard and pointing apparatus (e.g., a mouse or a trackball) through which the user can provide input to the computer. Other kinds of apparatuses may also be used to provide interaction with the user; for example, the feedback provided to the user may be any form of sensor feedback (for example, visual feedback, audible feedback, or haptic feedback); and input from the user may be received in any form, including acoustic input, voice input or haptic input.

The systems and technologies described herein can be implemented in a computing system including background components (e.g., as a data server), or a computing system including middleware components (e.g., an application server), or a computing system including front-end components (e.g., a user computer with a graphical user interface or a web browser through which users can interact with implementation of the systems and technologies described herein), or a computing system that includes any combination of such back-end components, middleware components, or front-end components. The components of the systems can be interconnected by any form or medium of digital data communication (e.g., a communication network). Examples of the communication network include local area network (LAN), wide area network (WAN), and Internet.

The computing system may include a client side and a server. The client side and the server are generally remote from each other and typically interact through a communication network. The relationship between the client side and server is generated by computer programs running on a corresponding computer and having a client side-server relationship with each other.

An embodiment of the present application further provides a map data updating method, which receives road information reported by an electronic device, determines at least one sequence according to the road information, where road information belonging to the same sequence in the at least one sequence has the same type and occurrence location; and updates map data according to the at least one sequence.

For the specific implementation principle of this embodiment, reference may be made to the record of the foregoing embodiments, which will not be repeated herein.

According to the technical solution of the embodiments of the present application, a server inputs each road information contained in the sequence into the neural network model, recognizes valid road information by combining context of each road information in the sequence and the neural network technology, and updates map data, thereby achieving the purpose of accurately updating the map data.

It should be understood that various forms of processes shown above can be used to reorder, add, or delete steps. For example, various steps recorded in the present application can be executed in parallel, sequentially or in different orders. As long as the desired results of the technical solutions disclosed in the present application can be achieved, there is no limitation herein.

The above-mentioned specific implementations do not constitute a limitation of the protection scope of the present application. It should be understood by those skilled in the art that various modifications, combinations, sub-combinations and substitutions may be made according to design requirements and other factors. Any modification, equivalent replacement, improvement and the like made within the spirit and principle of the present application shall be included in the protection scope of the present application.

What is claimed is:

1. A map data updating method, comprising:
   receiving road information reported by an electronic device, wherein the road information is road information broadcast to the electronic device by a roadside unit (RSU);
   determining at least one sequence according to the road information, wherein road information belonging to the same sequence in the at least one sequence has the same type and occurrence location;
   inputting road information contained in each sequence in the at least one sequence into a pre-trained neural network model to obtain a recognition result of a corresponding sequence, wherein the recognition result is used to indicate whether the road information belonging to the corresponding sequence is valid, and when the road information belonging to the corresponding sequence is valid, the road information belonging to the corresponding sequence is real road information; and
   updating map data by utilizing the road information belonging to the corresponding sequence if the road information belonging to the corresponding sequence is valid.

2. The method according to claim 1, wherein before the inputting road information contained in each sequence in the at least one sequence into a pre-trained neural network model to obtain a recognition result of a corresponding sequence, the method further comprises:
   acquiring a sample set, wherein samples in the sample set comprise positive samples and negative samples, the positive samples are real road information, and the negative samples are false road information;
   dividing the samples in the sample set to obtain at least one sample sequence, wherein samples belonging to the same sample sequence in the at least one sample sequence have the same type and occurrence location; and
   training an initial model according to the at least one sample sequence to obtain the neural network model.

3. The method according to claim 2, wherein the training an initial model according to the at least one sample sequence to obtain the neural network model comprises:
   determining, for an $i^{th}$ sample sequence, a feature vector of each sample in the $i^{th}$ sample sequence in an embedding layer of the initial model, wherein the $i^{th}$ sample sequence is obtained according to any sample sequence of the at least one sample sequence;
   learning, by utilizing a long-short-term memory recurrent neural network layer of the initial model, the feature vector of each sample in the $i^{th}$ sample sequence to obtain multiple context vectors, wherein each context vector of the multiple context vectors is used to indicate relationships among samples in the $i^{th}$ sample sequence; and
   training a Concatenate layer, a Fully Connected layer and a loss function layer of the initial model according to the multiple context vectors to obtain the neural network model.

4. The method according to claim 3, wherein the training a Concatenate layer, a Fully Connected layer and a loss function layer of the initial model according to the multiple context vectors to obtain the neural network model comprises:
   concatenating the multiple context vectors in the Concatenate layer of the initial model to obtain a concatenating vector; and
   learning, by utilizing the concatenating vector, the Fully Connected layer and the loss function layer of the initial model to obtain the neural network model.

5. The method according to claim 3, wherein the $i^{th}$ sample sequence is any sample sequence in the at least one sample sequence; or
   the $i^{th}$ sample sequence is a subsequence of any sample sequence in the at least one sample sequence.

6. The method according to claim 3, wherein the determining, for an $i^{th}$ sample sequence, a feature vector of each sample in the $i^{th}$ sample sequence comprises:
   extracting at least one of an electronic device feature, a roadside unit feature, and a road information feature corresponding to the each sample in the $i^{th}$ sample sequence, wherein the electronic device feature is used to characterize an electronic device that reports the each sample, the RSU feature is used to characterize an RSU that broadcasts the each sample to the electronic device, and the road information feature is used to characterize the each sample; and
   generating, for the each sample in the $i^{th}$ sample sequence, the feature vector of the each sample according to at least one of the electronic device feature, the RSU feature, and the road information feature corresponding to the each sample.

7. The method according to claim 6, wherein the electronic device feature comprises an identification of the electronic device, the number of times that the electronic device reports the each sample, or the number of times that the electronic device reports a valid sample, and the method further comprises:
   de-duplicating the each sample reported by the electronic device to determine the number of times that the electronic device reports a non-repetitive sample; and
   de-duplicating the valid sample reported by the electronic device to determine the number of times that the electronic device reports a non-repetitive valid sample.

8. The method according to claim 6, wherein the RSU feature comprises an identification of the RSU, the total number of times that the RSU broadcasts the each sample, and the number of times that the RSU broadcasts the valid sample, and the method further comprises:
   removing the number of times that the RSU repeatedly broadcasts the each sample from the total number of times that the RSU broadcasts the each sample; and
   removing the number of times that the RSU repeatedly broadcasts the valid sample from the number of times that the RSU broadcasts the valid sample.

9. The method according to claim 6, wherein the road information feature comprises at least one of the following features: a sample type, a sample location, a sample start time, a sample end time, and a time when the electronic device receives the each sample, and wherein the sample location is used to characterize a geographic location where the each sample occurs.

10. A non-transitory computer-readable storage medium storing computer instructions, wherein the computer instructions are used to cause a computer to execute the method according to claim 1.

11. An electronic device, comprising:
    at least one processor; and
    a memory communicatively connected with the at least one processor; wherein
    the memory stores instructions executable by the at least one processor, and the instructions are executed by the at least one processor to enable the at least one processor to execute the following steps:

receiving road information reported by an electronic device, wherein the road information is road information broadcast to the electronic device by a roadside unit (RSU);

determining at least one sequence according to the road information, wherein road information belonging to the same sequence in the at least one sequence has the same type and occurrence location;

inputting road information contained in each sequence in the at least one sequence into a pre-trained neural network model to obtain a recognition result of a corresponding sequence, wherein the recognition result is used to indicate whether the road information belonging to the corresponding sequence is valid, and when the road information belonging to the corresponding sequence is valid, the road information belonging to the corresponding sequence is real road information; and updating map data by utilizing the road information belonging to the corresponding sequence if the road information belonging to the corresponding sequence is valid.

12. The electronic device according to claim 11, the at least one processor is further enabled to execute the following steps:

acquiring a sample set before inputting the road information contained in each sequence in the at least one sequence into the pre-trained neural network model to obtain the recognition result of the corresponding sequence, wherein samples in the sample set comprise positive samples and negative samples, wherein the positive samples are real road information, and the negative samples are false road information; dividing the samples in the sample set to obtain at least one sample sequence, wherein samples belonging to the same sample sequence in the at least one sample sequence have the same type and occurrence location; and training an initial model according to the at least one sample sequence to obtain the neural network model.

13. The electronic device according to claim 12, wherein when training the initial model according to the at least one sample sequence to obtain the neural network model, the at least one processor is further enabled to execute the following steps: determining, for an $i^{th}$ sample sequence, a feature vector of each sample in the $i^{th}$ sample sequence in an embedding layer of the initial model, wherein the $i^{th}$ sample sequence is obtained according to any sample sequence of the at least one sample sequence; learning, by utilizing a long-short-term memory recurrent neural network layer of the initial model, the feature vector of each sample in the $i^{th}$ sample sequence to obtain multiple context vectors, wherein each context vector of the multiple context vectors is used to indicate relationships among samples in the $i^{th}$ sample sequence; and training a Concatenate layer, a Fully Connected layer and a loss function layer of the initial model according to the multiple context vectors to obtain the neural network model.

14. The electronic device according to claim 13, wherein when training the Concatenate layer, the Fully Connected layer and the loss function layer of the initial model according to the multiple context vectors to obtain the neural network model, the at least one processor is further enabled to execute the following steps: concatenating the multiple context vectors in the Concatenate layer of the initial model to obtain a concatenating vector; and learning, by utilizing the concatenating vector, the Fully Connected layer and the loss function layer of the initial model to obtain the neural network model.

15. The electronic device according to claim 13, wherein the $i^{th}$ sample sequence is any sample sequence in the at least one sample sequence; or the $i^{th}$ sample sequence is a subsequence of any sample sequence in the at least one sample sequence.

16. The electronic device according to claim 13, wherein when determining, for the $i^{th}$ sample sequence, the feature vector of the each sample in the $i^{th}$ sample sequence, the at least one processor is further enabled to execute the following steps: extracting at least one of an electronic device feature, a roadside unit feature, and a road information feature corresponding to the each sample in the $i^{th}$ sample sequence, and generating, for the each sample in the $i^{th}$ sample sequence, the feature vector of the each sample according to at least one of the electronic device feature, the RSU feature, and the road information feature corresponding to the each sample, wherein the electronic device feature is used to characterize an electronic device that reports the each sample, the RSU feature is used to characterize an RSU that broadcasts the each sample to the electronic device, and the road information feature is used to characterize the each sample.

17. The electronic device according to claim 16, wherein the electronic device feature comprises an identification of the electronic device, the number of times that the electronic device reports the each sample, or the number of times that the electronic device reports a valid sample, and the at least one processor is further enabled to execute the following steps: de-duplicating the each sample reported by the electronic device to determine the number of times that the electronic device reports a non-repetitive sample, and de-duplicating the valid sample reported by the electronic device to determine the number of times that the electronic device reports a non-repetitive valid sample.

18. The electronic device according to claim 16, wherein the RSU feature comprises an identification of the RSU, the total number of times that the RSU broadcasts the each sample, and the number of times that the RSU broadcasts the valid sample, and the at least one processor is further enabled to execute the following steps: removing the number of times that the RSU repeatedly broadcasts the each sample from the total number of times that the RSU broadcasts the each sample, and removing the number of times that the RSU repeatedly broadcasts the valid sample from the number of times that the RSU broadcasts the valid sample.

19. The electronic device according to claim 16, wherein the road information feature comprises at least one of the following features: a sample type, a sample location, a sample start time, a sample end time, and a time when the electronic device receives the each sample, and wherein the sample location is used to characterize a geographic location where the each sample occurs.

20. A map data updating method, comprising:

receiving road information reported by an electronic device;

determining at least one sequence according to the road information, wherein road information belonging to the same sequence in the at least one sequence has the same type and occurrence location; and updating map data according to the at least one sequence.

* * * * *